United States Patent [19]
Duhame et al.

[11] Patent Number: 5,588,257
[45] Date of Patent: Dec. 31, 1996

[54] GARAGE DOOR OPERATOR

[75] Inventors: Dean C. Duhame, Roseville; Richard P. Spens, Howell; Dana Lowell, Clarkston, all of Mich.; Chin-Feng Chan, Nan Kang; Ming-Hwa Shou, Hsin Tien, both of Taiwan

[73] Assignee: The Stanley Works, New Britain, Conn.

[21] Appl. No.: 295,272

[22] Filed: Aug. 24, 1994

[51] Int. Cl.[6] ................................................. E05F 11/00
[52] U.S. Cl. ................................................................ 49/199
[58] Field of Search .............................. 49/197, 199, 200; 74/440, 441

[56]         References Cited

U.S. PATENT DOCUMENTS

| | | |
|---|---|---|
| 2,394,163 | 2/1946 | Gebert . |
| 2,443,288 | 6/1948 | Anderson . |
| 2,545,775 | 3/1951 | Hall . |
| 3,051,014 | 8/1962 | Houk . |
| 3,069,151 | 12/1962 | Cook et al. . |
| 3,072,243 | 1/1963 | Davis . |
| 3,106,103 | 10/1963 | Smith . |
| 3,220,718 | 11/1965 | Wikkerink . |
| 3,235,246 | 2/1966 | Cowan . |
| 3,608,612 | 9/1971 | Pemberton . |
| 3,625,328 | 12/1971 | Carli . |
| 3,630,094 | 12/1971 | Carli . |
| 3,633,313 | 1/1972 | Lafontaine . |
| 3,664,444 | 5/1972 | Henson . |
| 3,685,142 | 8/1972 | Deming . |
| 3,694,664 | 9/1972 | Carli . |
| 3,694,903 | 10/1972 | Deming . |
| 3,696,680 | 10/1972 | Deming et al. . |
| 3,719,005 | 3/1973 | Carli . |
| 3,770,148 | 11/1973 | Hendren . |
| 3,851,125 | 11/1974 | Deming et al. . |
| 3,858,452 | 1/1975 | Gatland et al. ................... 49/199 X |
| 4,013,910 | 3/1977 | Deming . |
| 4,018,005 | 4/1977 | Harris . |
| 4,023,431 | 5/1977 | Pavlas . |
| 4,048,630 | 9/1977 | Deming et al. . |
| 4,107,877 | 8/1978 | Lee . |
| 4,131,830 | 12/1978 | Lee et al. . |
| 4,147,073 | 4/1979 | Mercier .................................. 49/199 X |
| 4,155,268 | 5/1979 | Lee et al. . |
| 4,155,269 | 5/1979 | Lee et al. .............................. 49/199 X |
| 4,241,540 | 12/1980 | Depperman ......................... 49/362 X |
| 4,307,271 | 12/1981 | Carli . |
| 4,334,161 | 6/1982 | Carli . |
| 4,352,585 | 10/1982 | Spalding .............................. 49/199 X |
| 4,414,778 | 11/1983 | Carli . |
| 4,520,684 | 6/1985 | Meyer et al. . |
| 4,575,277 | 3/1986 | Dickey et al. . |
| 4,628,636 | 12/1986 | Folger . |
| 4,649,016 | 3/1987 | Hardin ................................... 49/199 X |
| 4,661,085 | 4/1987 | Carli . |
| 4,819,743 | 4/1989 | Rousselot et al. . |
| 4,821,456 | 4/1989 | Nogaki . |
| 4,884,831 | 12/1989 | Emon . |
| 5,085,094 | 2/1992 | Clawson et al. .................... 49/199 X |
| 5,111,711 | 5/1992 | Engel et al. . |
| 5,143,477 | 9/1992 | Kanehira et al. . |
| 5,148,718 | 9/1992 | Kakuguchi et al. . |
| 5,221,869 | 6/1993 | Williams et al. . |
| 5,222,403 | 6/1993 | Angelini et al. . |
| 5,243,784 | 9/1993 | Whitaker et al. . |

OTHER PUBLICATIONS

U.S. Pat. Application Ser. No. 08/133,224, filed Oct. 7, 1993, entitled "Door Opener." (Notice of Allowance dated Nov. 28, 1994, Batch G62).

*Primary Examiner*—Kenneth J. Dorner
*Assistant Examiner*—Jerry Redman
*Attorney, Agent, or Firm*—Kane, Dalsimer, Sullivan, Kurucz, Levy, Eisele and Richard, LLP

[57]         ABSTRACT

A door operator for garage doors is provided which includes a motor, a multiple segmented drive screw and a traveler coupled to and reciprocating along the multiple segmented drive screw. The drive screw segments have non-circular ends which are slidably coupled to each other through a complementary sleeve. Springs are used to bias the screw segments toward one another. The traveler includes a lubricating pad for lubricating the drive screw as it passes along.

17 Claims, 5 Drawing Sheets

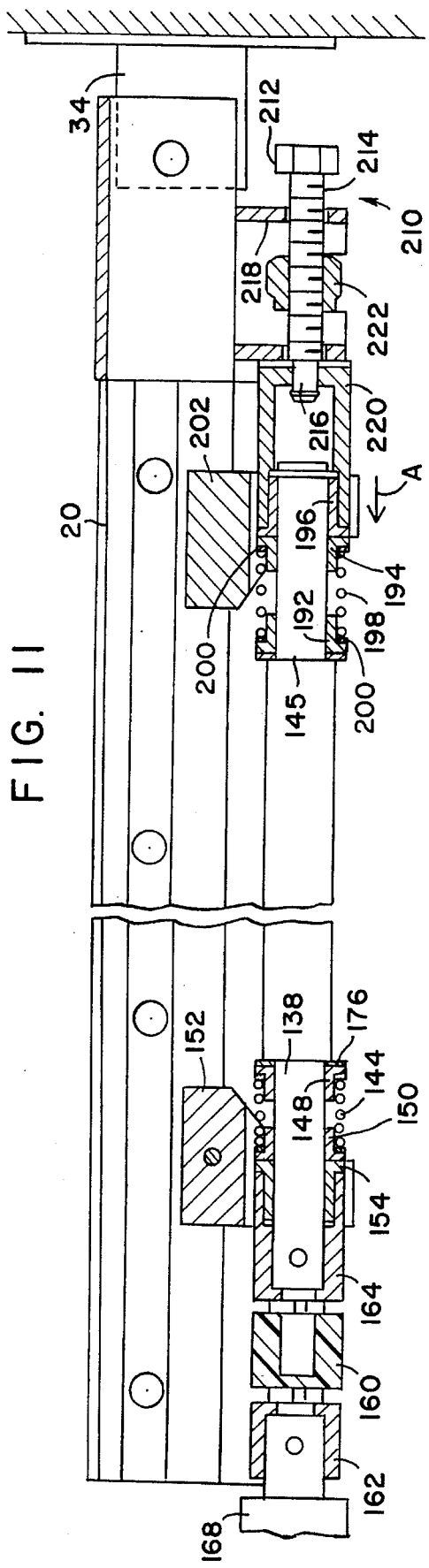
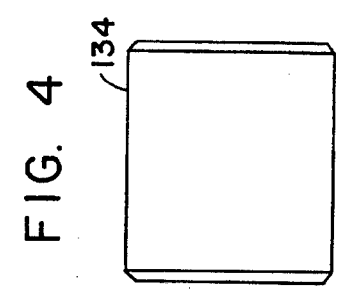
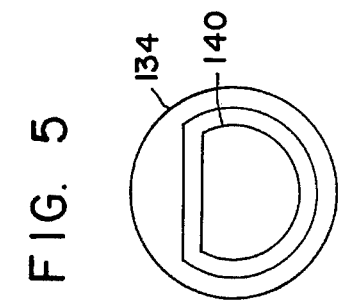
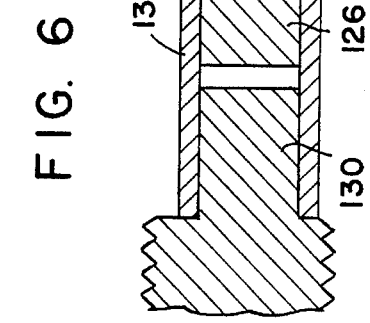
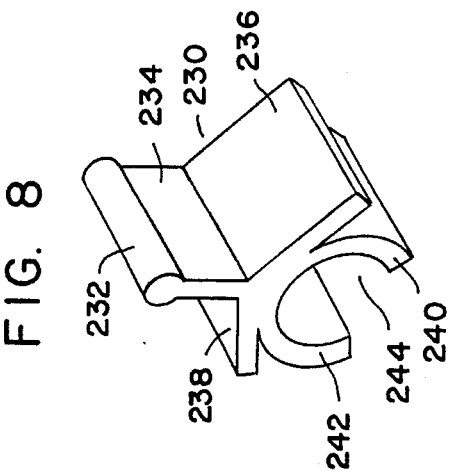

5,588,257

GARAGE DOOR OPERATOR

BACKGROUND OF THE INVENTION

A. FIELD OF INVENTION

This invention relates to an apparatus for operating a garage door and the like, and more particularly to a screw drive type of operator.

B. DESCRIPTION OF THE PRIOR ART

Apparatus for opening and closing garage doors or garage door operators have been manufactured and sold for many years. These operators have been designed to move a garage door automatically from a substantially vertical position to a substantially horizontal position and return again. Garage door operators are now commercially available in kits for the home improvement market. The kits generally consist of an A.C. motor, a support rail, a drive mechanism such as a drive screw and a traveler.

When all of the components of the kit are fully assembled, the drive screw is disposed in and supported by the rail, and the traveler is attached to the door and mounted on the rail to engage the drive screw. The motor operates the drive screw to reciprocate the traveler along the rail to selectively move the door from a vertical position to a horizontal position or vice versa. In an attempt to reduce the size of the package for shipping purposes, the drive screw and the support rail are constructed in segments which are attached together manually prior to installation. Such segmented screws are disclosed for example in U.S. Pat. No. 4,352,585.

These existing kits however have several problems. First, the drive screw segments are coupled by coupling mechanisms including screws, spring pins and holders which are not only difficult to assemble but are subject to large torsional forces and wear and tear during operation. Second, these door operators lack proper means for providing continuous lubrication for the drive screw and traveler over long periods of operation. Third, these door operators include a mechanism for defining the length of travel of the traveler for a particular door which is much too complicated for the average consumer to set. Moreover, these mechanisms are unreliable.

OBJECTIVES AND SUMMARY OF THE INVENTION

In view of the disadvantages of the prior art, it is an object of the present invention to provide a door operator which can be easily assembled and installed by a consumer.

Another object is to provide a door operator with a segmented drive screw which eliminates the need for screws or pins to couple the segments;

A further object is to provide a door operator with a mechanism for continuously lubricating its screw drive and traveler.

Yet another object is to provide a door operator with a reliable and simple adjustable mechanism for defining the length of travel of the door.

Other objects and advantages of the present invention are obtained with an apparatus for operating a door which employs an improved drive assembly in accordance with the present invention. In its broadest form the operator of the present invention, includes a motor, a drive assembly coupled to the motor having a drive screw including a plurality of segments, the ends of which are keyed to couple with one another, means for maintaining tension against the segments to eliminate play therebetween, and a traveler coupled to a door and adapted to move (along with the door) in response to rotation of the drive screw and to reciprocate along the length thereof. The means for maintaining tension comprises spring coils positioned at opposite ends of the drive screw.

The drive screw segments are each formed with at least one axial extension at one end thereof having a non-circular shape in cross-section such as a "D" shape. Sleeves each having a hole extending therethrough complimentary in shape to the axial extensions are provided to couple the axial extensions of two adjacent screw parts to one another. The sleeves are slightly longer than the combined length of two adjacent axial extensions so that a space is maintained between respective adjacent drive segments.

The traveler is provided with a pocket in which a lubricant absorbent pad is disposed in contact with the drive screw. In addition, the traveler is also provided with a permanent magnet so that the location of the traveler can be determined along the rail by reed switches or the like which react to the magnet.

The above and other objects, aspects, features and advantages of the invention will be more readily perceived from the description of the preferred embodiment thereof taken in conjunction with the accompanying drawings and appended claims.

BRIEF DESCRIPTION OF THE DRAWINGS

FIG. 4 illustrates a plan view of a sleeve shown in FIG. 2 used to couple adjacent screw segments;

FIG. 5 illustrates a cross-sectional view of the sleeve shown in FIG. 4;

FIG. 6 illustrates an axial cross-sectional view of the sleeve shown in FIG. 2 coupling two adjacent screw segments;

FIG. 6A illustrates a cross-sectional view of an axial extension shown in FIG. 2;

FIG. 7 illustrates a perspective view of the guide rail shown in FIG. 1;

FIG. 8 illustrates a perspective view of a stabilizer shown in FIGS. 2 and 3;

FIG. 11 illustrates a cross-sectional view of the garage door operator shown in FIG. 1.

DETAILED DESCRIPTION OF THE PREFERRED EMBODIMENT

Figure 1:
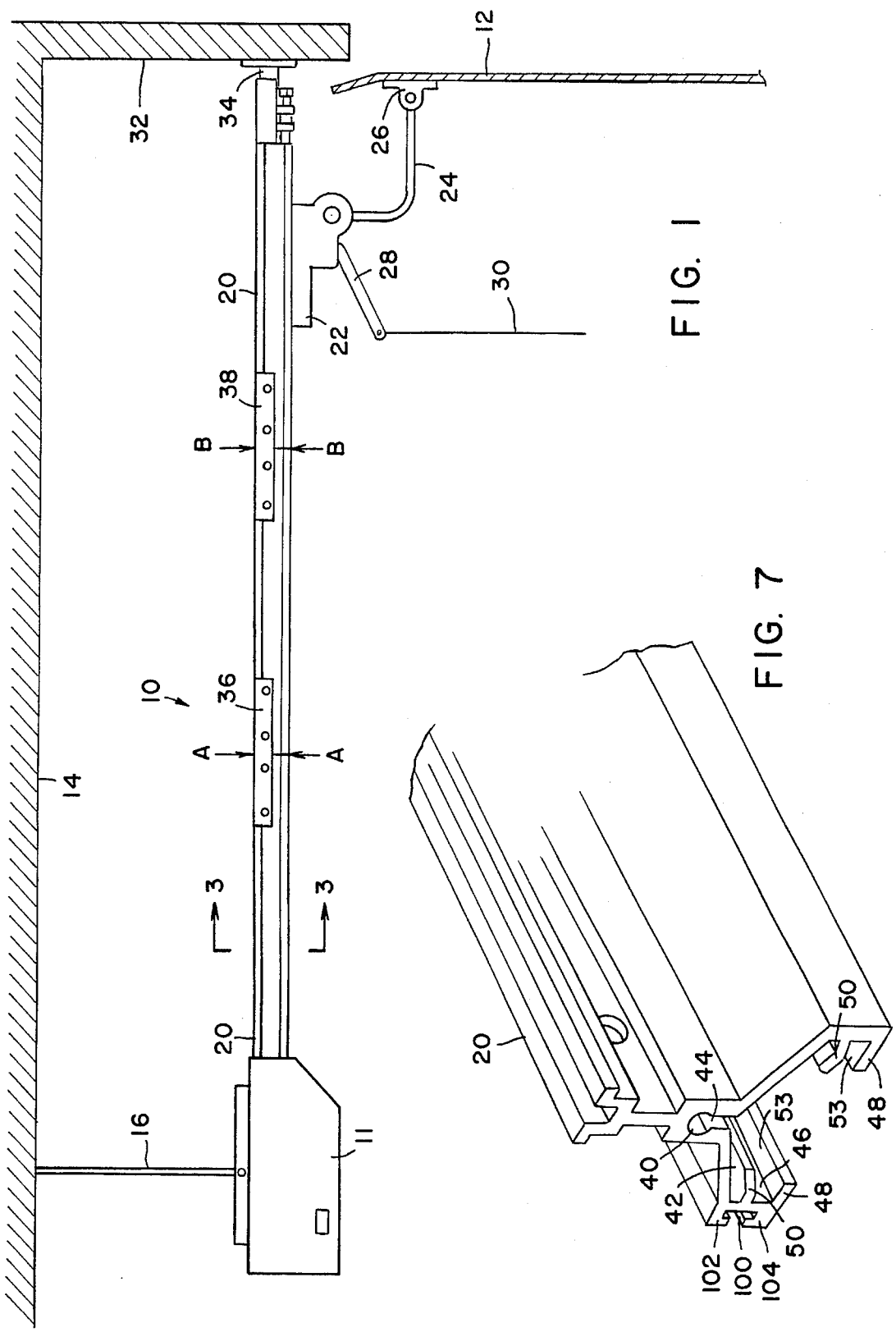
FIG. 1 illustrates a side cross-sectional view of an apparatus for operating a door constructed in accordance with the invention.

Referring to the FIG. 1, an apparatus 10 for opening and closing a generally rigid overhead garage door 12 constructed in accordance with the present invention is shown mounted to and hanging from ceiling 14 (and vertical wall 32) of a garage or similar structure. The apparatus 10 or door operator includes motor housing 11 mounted to ceiling 14 of the garage by mounting angle and straps 16 and digital control circuitry (not shown) within housing 11 for controlling the motor (not shown in FIG. 1) also within housing 11. The control circuitry is not pertinent to the discussion and will not be discussed in detail herein.

Apparatus 10 further includes drive assembly 18 (not show in FIG. 1), guide rail 20 for supporting drive assembly 18 and traveler 22 coupled to garage door 12. Traveler 22 is connected to door 12 by means of pivoting link 24 and door bracket 26. Traveler 22 includes bracket 28 and pull cord 30 for manually disengaging traveler 22 from its associated drive screw to terminate movement of traveler 22 in the event of an emergency. As the motor in housing 11 rotates, traveler 22 is caused to be displaced along guide rail 20 between preset limits of travel which correspond to fully opened and fully closed positions of door 12. Traveler 22 and its operation are discussed more fully below.

In the preferred embodiment, guide rail 20 is mounted to wall 32 of the garage via header bracket 34. Guide rail 20 however may be mounted to the ceiling 14 of the garage similar to the motor housing 11. In the preferred embodiment, guide rail 20 consists of three segments which are joined along lines A and B by bar links 36, 38 and a number of bolts.

Figure 3:
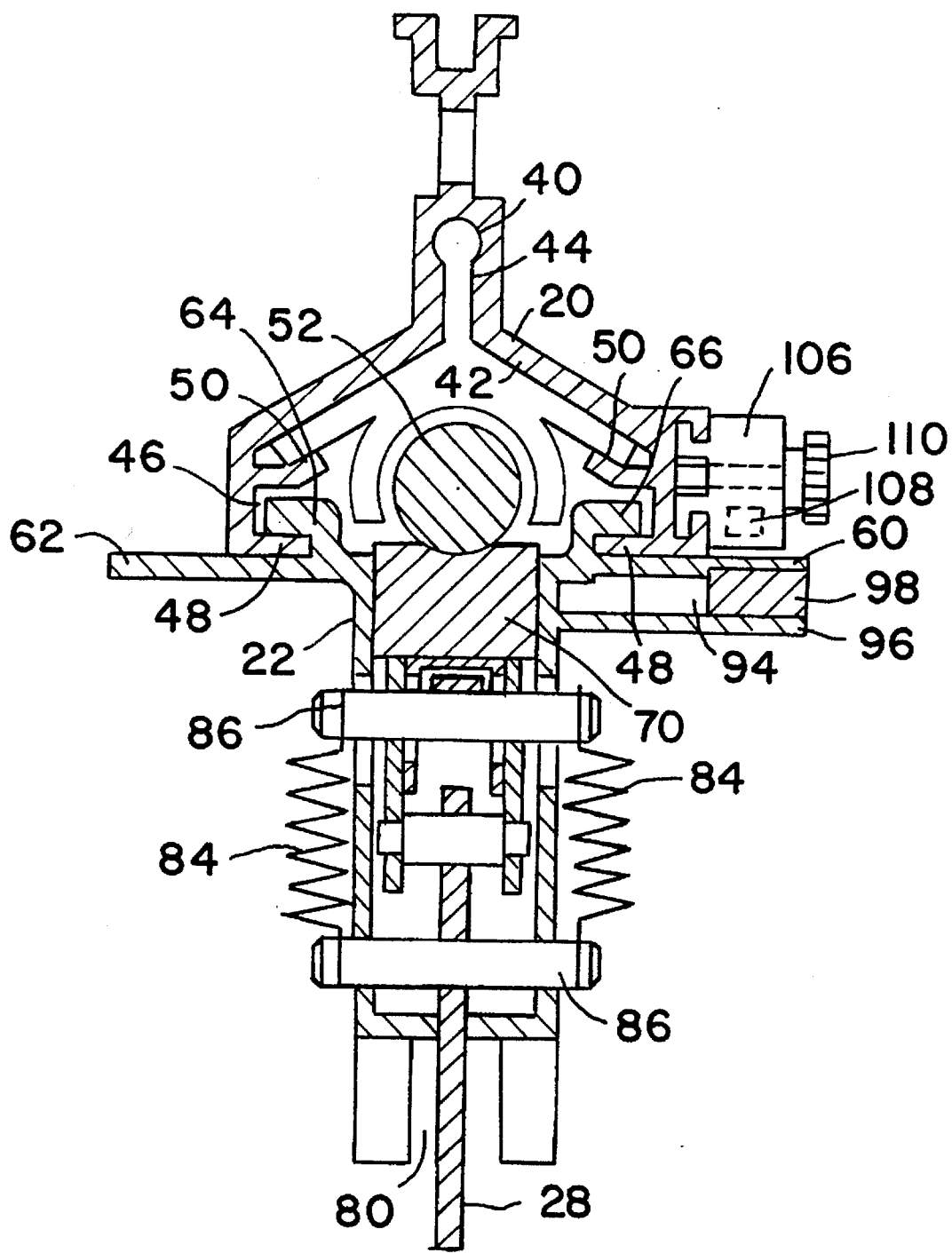
FIG. 3 illustrates a cross-sectional view of the apparatus shown in FIG. 1 taken along line 3—3.

Referring to FIGS. 3 and 7, guide rail 20 is shown in more detail. Guide rail 20 is preferably made from extruded aluminum and has a substantially hollow portion extending axially throughout the length thereof. The hollow portion is shaped by four channels. These four channels are cylindrical channel 40, triangular channel 42, narrow rectangular channel 44 therebetween, and substantially rectangular channel 46 having an open bottom. Guide rail 20 has substantially flat flanges 48, 50 which define rectangular channel 46 and inner track surfaces 53 for traveler 22.

Drive assembly 18 includes a drive screw 52 which is rotatably disposed within triangular channel 42 to be engaged by traveler 22. Drive screw 52 is driven in alternate directions by the motor in housing 11 to cause bidirectional travel of traveler 22 along guide rail 20 for the purpose of opening and closing door 12. Details of drive screw 52 and the operation thereof are described below.

Figure 9:
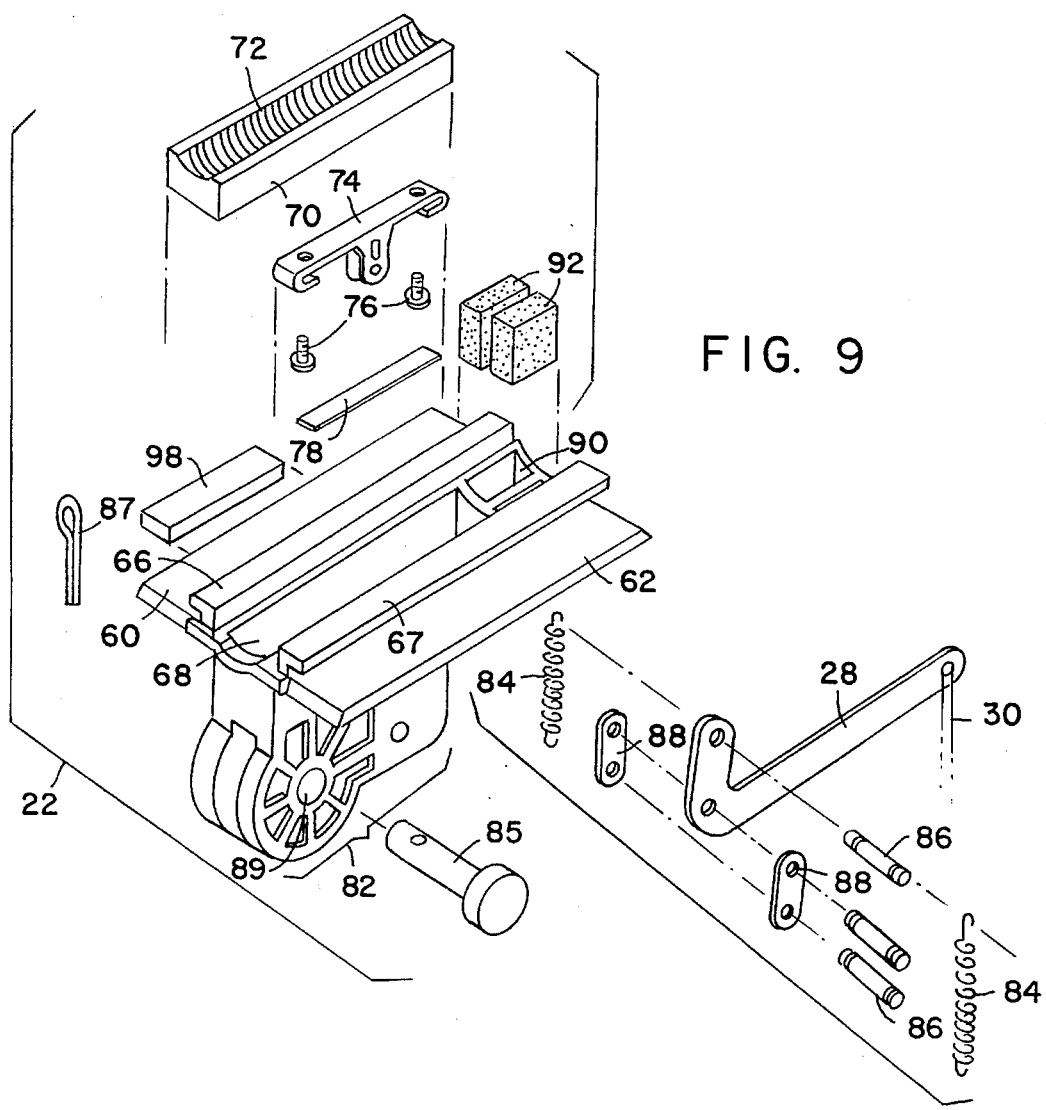
FIG. 9 illustrates a larger perspective view of the traveler shown in FIG. 1.
Figure 10:
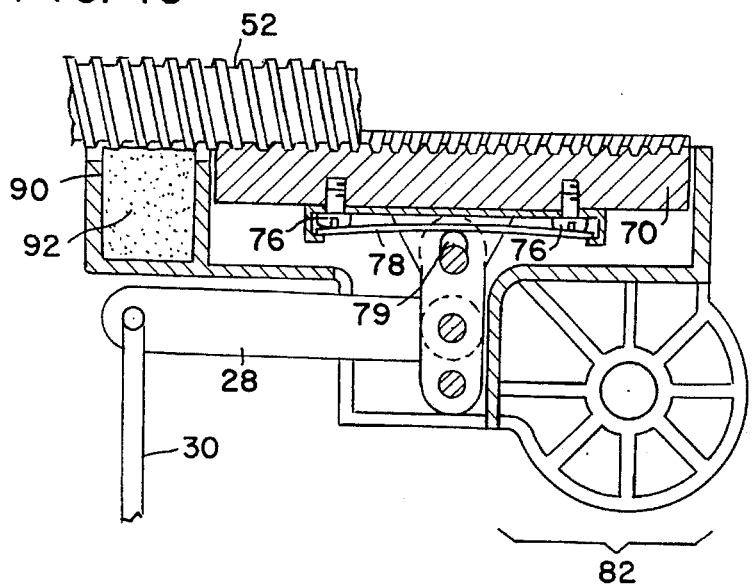
FIG. 10 illustrates a longitudinal cross-sectional view of traveler shown in FIG. 9.

As best seen in FIGS. 3, 9, and 10, traveler 22 includes two oppositely extending flat track arms or flanges 60, 62 which are disposed within rectangular channel 46 during operation and enclosed by flanges 48, 50. Traveler 22 also includes L shaped extensions 64, 66 extending above the surface of flanges 60, 62 and extending along the length of traveler 22. L shaped extensions 64, 66 each have an inner surface which rests on, i.e., supported by flanges 48 as traveler 22 moves along guide rail 20. L shaped extensions 64, 66 extend above and over flanges 48 to both guide traveler 22 through rectangular channel 46 along the track defined by flanges 48, 50 as well as prevent excess movement of traveler 22 in directions other than in an axial direction, i.e., longitudinal direction along the length of guide rail 20.

Traveler 22 includes cavity 68 that extends substantially the length of its body. Half nut 70 fits within a seat defined by the walls of cavity 68. The upper surface 72 of half nut 70 is threaded to mesh with the threads of drive screw 52. Half nut 70 is supported by bracket 74 attached underneath by screws 76. Bracket 74 has clips at the ends thereof to hold spring plate 78. Plate 78 has ends which press against screws 76 secured in half nut 70. Manual bracket 28 is disposed in channel 80 of hanging portion 82 of traveler 22 and has and end which extends into cavity 68 to engage plate 78. Manual bracket 28 is movably mounted to traveler 22 by biasing springs 84, pins 86 and plates 88 as shown in FIGS. 3, 9, and 10 to cause the end of bracket 28 extending into cavity 68 to engage and disengage spring plate 78. Note that the top pin 86 is permitted to slide within hole 79 in the engaging and disengaging positions of manual bracket 28 and spring plate 78. In the engaging position of bracket 28 shown in FIG. 10, plate 78 bows and bracket 74 is forced upwards to cause threads 72 of half nut 70 to engage drive screw 52.

Pull cord 30 is secured to bracket 28 to permit a user to pull bracket 28 downwardly to bias springs 84 until bracket 28 is no longer engaging plate 78 and hence threads 72 of half nut 70 are no longer engaging the threads of drive screw 52 to provide the previously mentioned emergency release. During engagement between drive screw 52 and half nut 70, half nut 70 is held against rotation whereby the rotation of drive screw 52 causes nut 70 to be displaced linearly along guide rail 20. The connection between half nut 70 and traveler 22 causes the combination thereof to operate as a unit displacing longitudinally along and within the opposing track flanges 48, 50 of guide rail 20.

In the preferred embodiment as described herein, half nut 70 may be disengaged from drive screw 52 to terminate movement of traveler 22 for emergency release. In other embodiments however, the traveler may be disengaged from the half nut to terminate movement of the traveler for emergency release. Also in the preferred embodiment, the half nut is a part of the traveler assembly. In other embodiments, however, the half nut may not be a part of the traveler assembly.

Traveler 22 further includes a cavity or pocket 90 located adjacent cavity 68. Pocket 90 contains pads 92 saturated with lubricant. Pocket 90 has an opening as shown to allow pads 92 to engage the drive screw 52 as traveler 22 reciprocates along guide rail 20. In this manner, lubrication is provided continuously to drive screw 52 and half nut 70 thereby reducing wear and tear on these components and thereby prolonging the life of the door operator. It is noted that pocket 90 may be refilled with lubricant to keep pads 92 saturated. In addition, the lubrication pads may be replaceable. Also, pocket 90 may contain a solid lubrication material, e.g., graphite, which may be replaced.

Traveler 22 also includes a cavity which is defined by flange 60 and ledge 96 extending from the hanging portion 82 of traveler 22. The cavity is a second pocket 94 which has an opening to receive a permanent magnet 98. Guide rail 20 has a channel 100 along the side and length thereof, defined by flanges 102, 104. As best seen in FIG. 3, socket 106 has outwardly, extending flanges which loosely fit within the cavity flanges 102, 104 to permit socket 106 to slide within channel 100. Within socket 106 there is a reed switch 108 of the known type and a thumb screw 110 also of the known type extending through socket 106. When thumb screw 110 is fully rotated in socket 106, its end presses against the inner surface of channel 100 causing the inner surface of the outwardly extending flanges to press flush against the inside surface of flanges 102, 104. As a result socket 106 is secured to guide rail 20. Another socket (not shown) identical to socket 106 is provided at a second position in channel 100 along the length of guide rail 20.

During installation, the location of traveler 22 along guide rail 20 is determined at open and closed positions of garage door 12. These positions are marked by socket 106 and the socket not shown. The reed switches in the sockets are coupled to the control unit (not shown) of apparatus 10. These reed switches are activated by the magnetic fields of the permanent magnet 84 of traveler 22 when the permanent magnet is in the proximity thereto. In this manner, the control unit receives signals from the reed switches to indicate when the door is fully opened or fully closed. These positions may easily be adjusted by loosening the thumb screws and moving the sockets accordingly.

Also shown in FIGS. 9 is an unthreaded bolt 85 to be inserted through hole 89 in hanging portion 82 of traveler 22 and through pivoting link 24 (shown in FIG. 1) to receive a pin 87 for coupling traveler 22 to door bracket 26.

Figure 2:
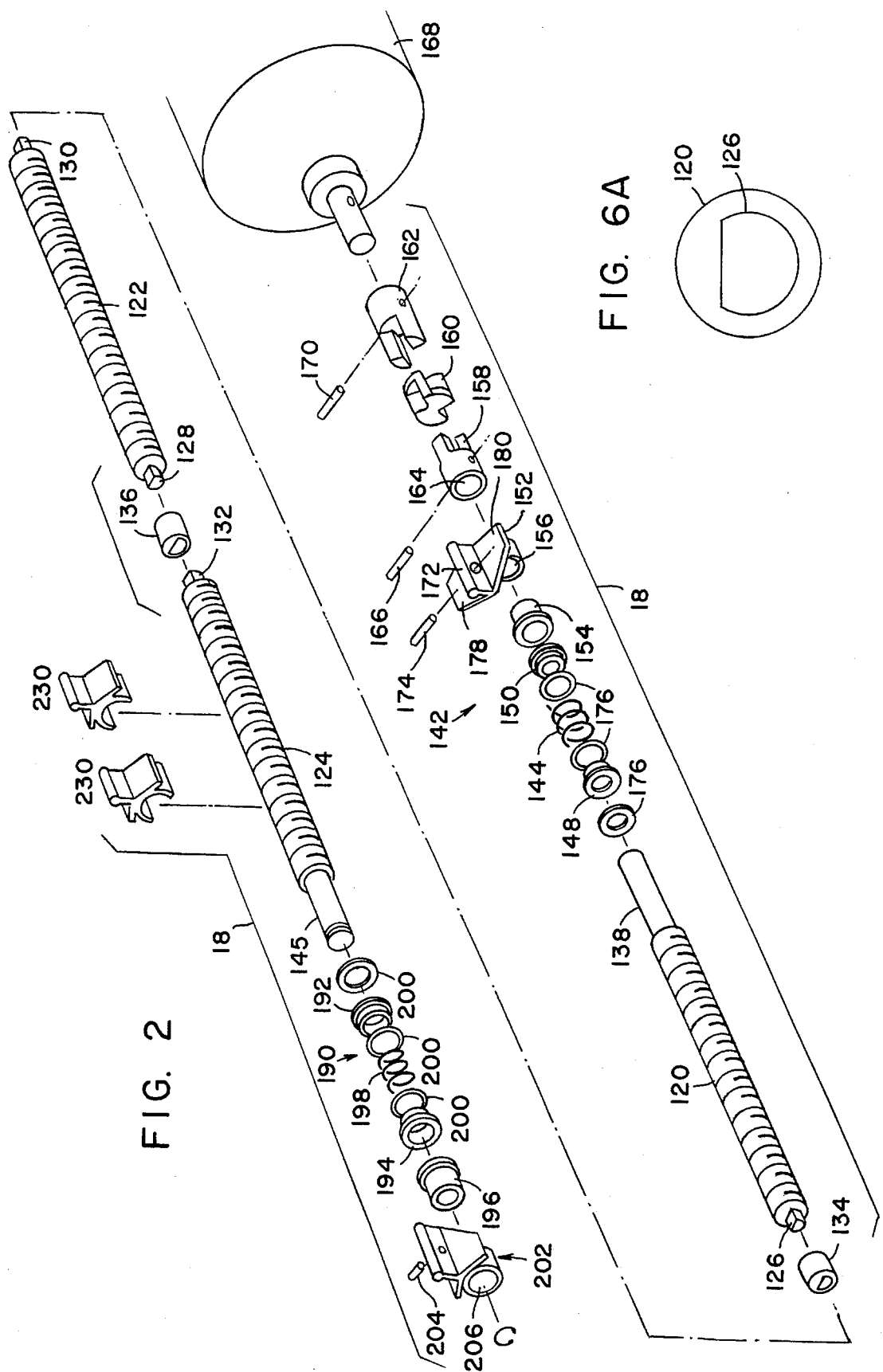
FIG. 2 illustrates an exploded view of a drive assembly used in the apparatus shown in FIG. 1 in accordance with the present invention.

Referring to FIG. 2, there is shown drive assembly 18 in accordance with the present invention. In the preferred embodiment, drive screw 52 is formed of three segments 120, 122, 124 each having the same helical threaded surface extending substantially along the length thereof. Segments 120, 124 each have one end constructed with a generally cylindrical axial extension preferably shaped in the form of a letter "D" in cross-section. These axial extensions are identified as 126, 132. It should be noted that substantially any axial extension can be used so long as it has a non-circular shape. FIG. 6(a) shows a cross-sectional view of axial extension 126. Segment 122 also has an axial extension similarly shaped at both ends thereof. These extensions are identified as 128, 130. All extensions have a non-threaded surface.

The segments 120, 122, 124 are constructed such that the diameter of the main body (threaded portion) of each segment is larger than the diameter of each axial extension. Because of the differences in diameter, a shoulder is formed at the junction between the main body and the respective axial extension of the drive segment.

Drive assembly 18 further includes two sleeves 134, 136 shown in FIGS. 4, 5 and 6. Since sleeves 134, 136 are identical, sleeve 136 is discussed only. Sleeve 134 is used to couple adjacent screw segments 120, 122 together. Sleeve 134 has hole 140 extending axially throughout the length thereof, and hole 140 is complimentary in shape to the shape of the axial extensions, 126, 134. In addition, hole 140 is constructed with dimensions slightly larger than the dimensions of the "D" shaped axial extensions 126, 130 to permit them to easily slide longitudinally in and out of sleeve 134 to facilitate assembly.

Sleeve 134 and extensions 126, 130 are sized so that a space is maintained between extensions 126, 130. That is, when axial extensions 126, 130 are fully assembled, i.e., when they are inserted into sleeve 134 and the shoulders of segments 120 and 122 abut the edges of sleeve 134, extensions 126, 130 fall short of one another. In the preferred embodiment, a space of several thousands of an inch is maintained between adjacent axial extensions. The same construction applies to sleeve 136 and extensions 128, 132 of segments 122, 124 respectively.

The longitudinal length of sleeve 134 is constructed to equal an even number of screw drive threads and is constructed longer than the combined lengths of two axial extensions of the screw segments. Thus, when the screw segments are assembled as described above, the threads of adjacent screw segments are automatically oriented in phase to allow traveler 22 to pass from segment 120 to segment 122 over sleeve 134 smoothly and without interruption. Segments 120, 124 also have shafts 138, 145 extending axially from their other ends.

Drive assembly 18 also includes compressioning device 142 which consists of spring coil 144 and two bushings 148, 150. Bushings 148, 150 are constructed to fit into the ends of spring coil 144. Bushings 148, 150 and spring coil 144 located therebetween are, mounted on shaft 138 as follows.

Bushings 148, 150 each have a flange at one end thereof. The flange of bushing 148 has two opposite facing surfaces, one for engaging the shoulder defining the base of shaft 138 of screw segment 120 and the other for engaging a first end of spring coil 144. The flange of bushing 150 has two opposite surfaces, one for engaging a second opposing end of spring coil 144 and the other for engaging a third bushing as described below.

Tensioning device 142 also includes a support hanger 152 and a third bushing 154 mounted on shaft 138. Support hanger 152 has a hollow cylindrical sleeve 156 for receiving shaft 138 as well as bushing 154. Bushing 154 has a flange with two opposite facing surfaces, one for engaging the surface of bushing 150 and the other for engaging the mouth of cylindrical sleeve 156.

Tensioning device 142 further includes first, second and third coupling pieces 158, 160, 162. First coupling piece 158 has a blind bore 164 for receiving shaft 138 of screw segment 120 which extends from cylindrical sleeve 156. Shaft 138 is permanently secured inside the blind bore of first coupling piece 158 by pin 166 extending through coupling piece 158 and through a hole in shaft 138. Coupling piece 158 and cylindrical sleeve 156 have substantially the same diameter. The lip defining the blind bore of coupling piece 158 abuts against a second opposing mouth of cylindrical sleeve 156. Second and third coupling pieces 160, 162 are used to couple shaft 138 within first coupling piece 158 to motor 168. Third coupling piece 162 is secured to the shaft of motor 168 by pin 170 extending therethrough and through a hole in the shaft of motor 168 as shown. Cylindrical sleeve 156 has a bearing surface which allow shaft 138 to rotate therein in response to the rotation of the shaft of motor 168.

Support hanger 152 has a rib 172 axially extending the length thereof. Rib 172 is adapted to be inserted into the cylindrical and narrow channels 40, 44 of guide rail 20. Support hanger 152 is permanently secured to guide rail 20 by pin 174. Shaft 138 is capable of moving axially, i.e., in a longitudinal direction. The location of support hanger 152 determines the maximum distance drive screw 52 can move axially within guide rail 20 toward motor 168. Spring coil 144 and first coupling piece 158 together limit the axial play of shaft 138 and hence drive screw 52 within guide rail 20.

Tensioning device 142 further includes several washers 176 disposed adjacent to the surfaces of the flanges of the bushings as shown. Bushings 148, 150, 154 are made of a material with a low coefficient of friction such as OILITE bronze. The washers 176 may be made of stainless steel.

Support hanger 152 also includes two side wings 178, 180 bilaterally disposed and having upper surfaces that are positioned against the inside surface of the walls defining triangular channel 42. Support hanger 152 is so constructed to help stabilize drive screw 52, i.e., help prevent drive screw 52 from moving in directions other than axially, i.e., in a longitudinal direction.

Drive assembly 18 also includes second tensioning device 190 at the opposite end of and similar to tensioning device 142. Tensioning device 190 includes bushings 192, 194, 196, spring coil 198, and washers 200. In addition, device 190 also includes support hanger 202 which is inserted in guide rail 20 and secured thereto by pin 204 as described above with respect to support hanger 152. Support hanger 202 has a hollow cylindrical sleeve 206 to receive shaft 145 of segment 124.

As seen in FIG. 11, drive assembly 18 also includes tightening bolt 210 with head 212, threaded shaft 214, and axial extension 216. During the assembly of the door operator 10, shaft 214 is inserted into a bore in member 218 hanging from the rail adjacent the door bracket 34. Axial extension 216 is inserted in a bore in coupling sleeve 220. The threads of threaded shaft 214 engage the threads of nut 222 disposed within hanging member 218. As bolt 210 is rotated, the shoulder separating threaded shaft 214 and axial extension 216 presses against coupling sleeve 220 and urges bushings 196 against bushing 194. As bushing 196 is pushed longitudinally in direction A by bolt 210, springs 144, 198 are compressed. This action is continued until bolt head 212 comes in contact with the surface of hanging member 218, thereby pretensioning springs 144, 198.

The springs apply axial thrust to screw segments 120, 122, 124 to ensure that they do not separate while the door operator 10 is in operation. Once the springs 144, 198 are pretensioned, any slack between the screw segments 120, 122, 124 is automatically eliminated. Screw segments 120, 122, 124 are in effect floating in the longitudinal direction within guide rail 20 between support hangers 152, 202.

As the motor 12 rotates, shaft 138 turns, which transmits rotation to the segments 120, 122, 124 via axial extensions 126, 130 and 128, 132 and sleeves 134, 136 respectively. Thus, torque is transmitted from one screw segment to another through the respective sleeve which couples adjacent segments. Consequently, wear and tear on the coupling means and the drive segments is reduced.

The door operator 10 further includes a number of stabilizers 230 as shown in FIG. 8. Each stabilizer 230 includes rib 232 axially disposed on the top thereof and a rectangular portion 234 both extending along the length thereof. Rib 232 and rectangular portion 234 are constructed to be slidably inserted in the cylindrical and narrow channels 40, 44 in guide rail 20, prior to installing drive assembly 18. Stabilizer 230 hangs from the top of guide rail 20. The stabilizers are generally equally spaced along the length of guide rail 20. Stabilizer 230 has two wings 236, 238 which have surfaces which remain substantially flush against the surface of the inner wall that defines triangular channel 44. Stabilizer 230 also includes two cylindrical shaped flanges 240, 242 extending therefrom. Flanges 240, 242 are designed to define a cavity 244 to receive drive screw 52. Flanges 240, 242 however have an opening extending the length of the stabilizer to allow drive screw 52 to engage half nut 70 of traveler 22. The inner walls of flanges 240, 244 are situated closely to drive screw 52 in order to stabilize the movement of drive screw 52. That is, flanges 242, 244 are constructed to act as guards to prevent drive screw 52 from moving in directions other than the direction in which traveler 16 moves, i.e., longitudinally.

Although the present invention has been described with reference to the preferred embodiment, it will be apparent to one skilled in the art that variations and modifications may be made within the spirit and scope of the invention, that the drawings and description of the preferred embodiments are made by way of example rather than to limit the scope of the invention, and it is intended to cover within the spirit and scope of the invention all such changes and modifications.

We claim:

1. An apparatus for operating a garage door including:
   (a) a motor;
   (b) a drive assembly coupled to said motor, said drive assembly comprising:
      (i) a drive screw extending longitudinally and having a first end coupled to said motor for rotation, said drive screw including at least two drive segments;
      (ii) coupling means for coupling ends of said segments; and
      (iii) means for maintaining compression on said segments in a longitudinal direction toward said coupling means to maintain said segment ends in engagement with said coupling means; and
   (c) means coupled to said door, responsive to rotation of said drive screw and moving therealong in said longitudinal direction for moving said door in response thereto.

2. The apparatus of claim 1 wherein each of said plurality of segments has a portion at one end thereof extending axially, therefrom having a non-circular cross-section, said coupling means comprises a plurality of sleeves for coupling said screw segments together, each sleeve having a hole extending therethrough, said hole having a shape in cross-section complimentary to said portion to receive said portion and transmit torque from one of said segments to an adjacent segment.

3. The apparatus of claim 2 wherein said drive assembly comprises means for maintaining a space between adjacent axially extending portions of said plurality of screw segments.

4. The apparatus of claim 3 wherein said portion of each of said plurality of segments is "D" shaped in cross-section.

5. The apparatus of claim 1 wherein said means for maintaining compression comprises a coil for engaging said drive screw and force applying means for applying a longitudinal force to said coil.

6. The apparatus of claim 1 wherein said means for moving said door comprises a traveler adapted to move along said drive screw and connected to said door, said traveler including means for lubricating said drive screw as said traveler moves therealong.

7. The apparatus of claim 6 wherein said traveler includes a pocket formed therein and a lubricating pad disposed within said pocket and extending out of the pocket to engage the drive screw and deposit lubricant thereon.

8. The apparatus of claim 1 further including means for indicating the position of said means for moving said door, said position indicating means including a permanent magnet mounted on said moving means and magnet responsive sensing means mounted along said drive screw.

9. The apparatus of claim 1 further including means for supporting said drive screw and means engaging said supporting means for preventing said drive screw from moving in a direction other than said longitudinal direction.

10. An apparatus operating a door comprising:
    a rail extending in a longitudinal direction;
    a motor disposed at one end of said rail;
    a drive screw having a first end connected to said motor for rotation therewith and a second end opposite said first end, said drive screw comprising a plurality of segments, each segment having a threaded surface;
    coupling means for slidably coupling adjacent ones of said segment ends to transmit torque from one segment to another;
    compressioning means for applying an inwardly directed compressioning load to said first and second ends of said drive screw to bias said ends toward each other;
    means engaging said rail for supporting said drive screw;
    a traveler having threads mounted on said rail and adapted to move along said segments in said longitudinal direction in response to rotation thereof, said traveler being connected to said door.

11. The apparatus of claim 10 wherein said compressioning means includes a coil spring at each end of said drive screw, each coil spring having a bushing disposed between the ends thereof, said spring and said bushing being disposed coaxially with said segments.

12. The apparatus of claim 11 wherein said compressioning means further includes means for precompressioning said coil springs.

13. The apparatus of claim 12 wherein said precompressioning means includes a tightening bolt mounted at an end of said screw drive.

14. The apparatus of claim 10 wherein said traveler includes a pocket and a lubricating pad disposed within said pocket for engaging said drive screw as said traveler moves along said rail.

15. The apparatus of claim 10 further comprising position detecting means for detecting a position of said traveler along said rail, said position detecting means including a pocket formed in said traveler, a permanent magnet disposed in said pocket, and means responsive to said magnet positioned on said rail.

16. The apparatus of claim 15 wherein said magnet responsive means is disposed within a bracket slidably mounted on said rail.

17. The apparatus of claim 16 wherein said magnet responsive means comprises a reed switch.

* * * * *